Feb. 10, 1953 N. GOODMAN 2,627,692
TENSION RELEASING DEVICE
Filed Dec. 26, 1947
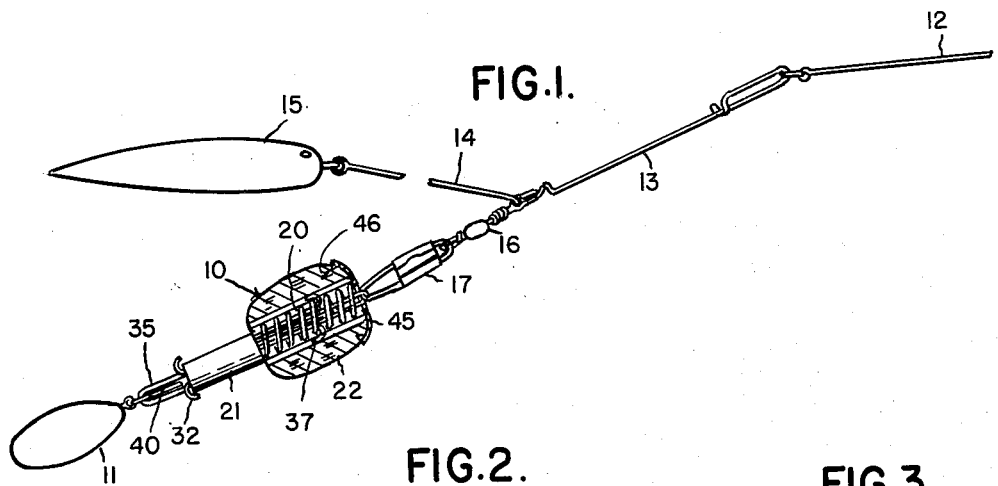
FIG.1.
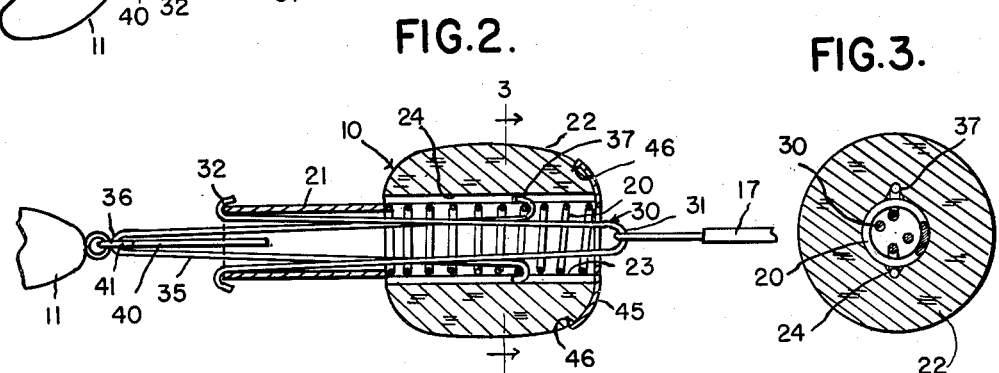
FIG.2. FIG.3.
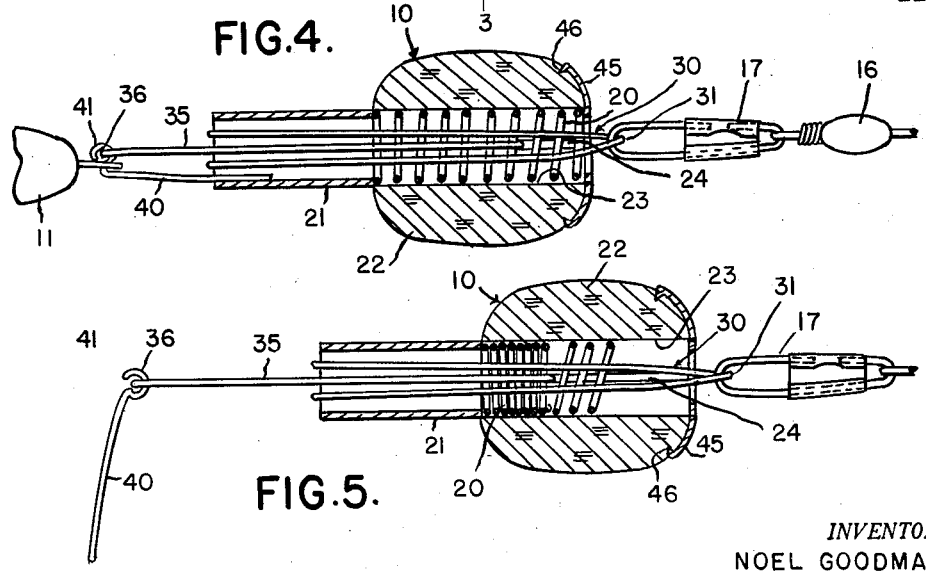
FIG.4.
FIG.5.
INVENTOR.
NOEL GOODMAN
BY
ATTORNEYS Patented Feb. 10, 1953

2,627,692

UNITED STATES PATENT OFFICE 2,627,692

TENSION RELEASING DEVICE

Noel Goodman, Detroit, Mich.

Application December 26, 1947, Serial No. 793,775

17 Claims. (Cl. 43—43.12)

The present invention relates to a tension releasing device and more particularly to a device adapted for use in fishing, as for example in supporting a sinker which is effective to release the sinker when a predetermined tension on the line is exceeded.

It is an object of the present invention to provide a tension releasing device effective to release a trigger mechanism upon attainment of predetermined tensions.

It is a further object of the present invention to provide a tension releasing device including means for adjusting the tension at which the device releases.

It is a further object of the present invention to provide a tension releasing device comprising a compressible tubular guide having securing elements extending therethrough and secured at opposite ends to corresponding ends of the guide, one of said securing elements having a trigger pivoted thereto, the free end of which is receivable in one end of the guide.

It is a further object of the present invention to provide, in fishing tackle, a sinker support including a float element attached to the support in combination with means for releasing the sinker when a predetermined tension is applied to the line, whereby the float element will free the structure and float it to the surface.

Other objects and features of the invention will become apparent as the description proceeds, especially when taken in conjunction with the accompanying drawings, wherein:

Figure 1 is a diagrammatic sectional view illustrating the manner in which the tension releasing device is used to secure a sinker to a fishing line;

Figure 2 is a longitudinal section through the tension releasing device;

Figure 3 is a section on the line 3—3 of Figure 2;

Figure 4 is a view similar to Figure 2 with the parts rotated 90°; and

Figure 5 is a view similar to Figure 4 showing the action of the device under tension.

Referring now to Figure 1, there is illustrated generally at 10 a tension releasing device for securing a sinker 11 or the like to a fishing line 12. Preferably a wire attaching and supporting element 13 of some rigidity is provided, this element including an arm 14 for attachment to a plug or other type of lure 15. Intermediate the element 13 and the tension releasing device 10 is a conventional swivel 16 and a releasable attaching device 17 of conventional form for securing the tension releasing device 10 to the swivel 16.

Referring now to Figures 2 to 5, the tension releasing device comprises essentially a tubular guide made up of a helically coiled spring 20 and a transparent tubular element 21. The transparent tubular element 21 and the spring 20 are of the same diameter so that they may engage in end abutting relation as illustrated in the figures. Sleeved over the spring 20 is a float element 22 which is herein illustrated as formed of cork and having an internal bore 23 for receiving the spring and also internal grooves 24 for receiving the bent over ends of an attaching element later to be described.

A first attaching element or connector 30 which may conveniently be formed from a doubled piece of wire extends through the tubular guide from one end to the other, the doubled portion or bight 31 thereof protruding beyond one end of the guide. In this instance the bight 31 is illustrated as protruding beyond the end of the helical spring 20. The opposite ends of the attaching element 30 are bent over as indicated at 32 to provide hooks which engage the opposite end of the tubular guide, in this instance the end of the transparent tube 21. A generally similar attaching element or connector 35 is arranged in opposite direction to extend through the tube and has its doubled portion or bight 36 extending beyond the opposite end of the guide, in this instance beyond the end of the transparent tube 21. The opposite ends of the attaching element 35 are outwardly bent to form hooks 37 which may engage over the outer end of the spring 20. Inasmuch as the spring 20 is coiled into a helix, relative rotation between the spring and the attaching element 35 will cause the hooks 37 to be threaded longitudinally of the spring so as to vary the effectiveness of the spring in releasing under tension. In Figure 2 the hooks 37 are shown as engaging the fourth convolution of the spring. It is within the contemplation of the present invention, however, that the attaching element 35 shall be rotated with respect to the spring so that its hooks 37 engage over the outermost convolution of the spring 20. The tubular element 21 is sleeved over and supported by the wire attaching elements 30 and 35. These wire elements are resilient and the tubular element 21 will be held by frictional engagement. However, the hooks 32 prevent movement of the tubular element 21 to the left as seen in Figure 2, and also serve to take up the thrust induced by compression of the spring when tension is applied between the attaching elements 30 and 35.

The spring 20 is likewise sleeved over and supported by the wire connectors and it is retained in end abutting relation with the tubular element 21. Thus in the completed assembly the spring 20 and the tubular element 21 together comprise a tubular guide structure which is compressible longitudinally.

Secured to the outer end or bight 36 of the attaching element 35 is a trigger 40 having one end bent to form an eye 41 by means of which the trigger is pivoted to the bight of the attaching element 35. With the parts in the relationship shown in Figure 3, the free end of the trigger 40 is received within the outer end of the transparent sleeve 21 and accordingly may serve to retain a device, such for example as the sinker 11, in assembled relation with respect to the attaching element 35.

Preferably a protecting plate 45 is provided over the leading end of the float 22. This protecting plate may have attaching prongs 46 embedded into the cork and retaining the plate in position. The plate serves as an abutment to protect the cork and also prevents the entry of foreign material into the interior of the spring 20 and transparent tube 21.

If the sinker becomes snagged, it is possible to release the sinker and thereby to free the plug or lure 15 and component parts by increasing the tension on the line.

Referring now to Figure 5, it will be observed that tension applied through the releasable conector 17 to the attaching element 30 acts to compress the coil spring 20 somewhat as illustrated in Figure 5 and thereby to permit the attachment element 35 to move outwardly with respect to the transparent tube 21 to a position in which the trigger 40 is freed from the transparent tube 21, thereby releasing the sinker 11. At this time due to the buoyancy of the float 22 the tackle will rise to the surface.

The device may also operate to free the equipment in the event that the float becomes snagged, in which case the operation is the same except that when the sinker is released the float will thereby be effective to raise the snagged equipment upwardly and thereby release it. In this case release of the sinker is accomplished by compression of the spring 20 as in the case where tension is applied between the connector elements 30—35. However, compression of the spring in the case where the float becomes snagged results from tension applied between the connector element 30 and the float 22. The protecting plate 45, as clearly seen in Figure 2, will abut the right hand end of the spring 20, thus compressing the spring and causing the connector element 35 to move to the left with respect to the tube 21.

The drawings and the foregoing specification constitute a description of the improved tension releasing device in such full, clear, concise and exact terms as to enable any person skilled in the art to practice the invention, the scope of which is indicated by the appended claims.

What I claim as my invention is:

1. A helically coiled spring, a float element surrounding said spring, a tubular element abutting one end of said spring and constituting therewith a compressible tubular guide, a first connector extending through and protruding beyond one end of said guide and having means engaging said guide adjacent the other end thereof, a second connector extending through and protruding beyond one end of said guide and having means engaging said guide adjacent the opposite end thereof, and a trigger pivoted at one end to the protruding end of one of said connectors, the free end of said trigger being receivable in said guide when said guide is uncompressed, the interior of said float element having internal slots slidably receiving the means on one of said connectors which engages said tubular guide, the means on one of said connectors engaging said tubular guide comprising means threadedly engaging the convolutions of said spring to adjust the effective length of said spring in releasing said trigger.

2. A helically coiled spring, a float element surrounding said spring, a tubular element abutting one end of said spring and constituting therewith a compressible tubular guide, a first connector extending through and protruding beyond one end of said guide and having means engaged therewith adjacent the other end thereof, a second connector extending through and protruding beyond the other end of said guide and having means engaging the opposite end thereof, and a trigger pivoted at one end to the protruding end of one of said connectors, the free end of said trigger being receivable in said guide when said guide is uncompressed, the interior of said float element having internal slots slidably receiving the means on one of said connectors which engages said guide.

3. A releasable securing means comprising a compressible tubular guide composed of a helical coil spring and a tubular element of the same internal and external diameter as said spring, said spring and element being in end-abutting relation, a first connector in the form of a doubled wire located in said guide and having hooks at its open end engaging one end of said guide and the doubled end extending beyond the opposite end of the guide, a second connector in the form of a doubled wire located in said guide and having hooks at its open end secured to said guide adjacent the said opposite end thereof, and the doubled end of said second connector extending beyond the said one end of said guide, and a trigger pivoted at one end to the doubled end of one of said connectors, the free end of said trigger being receivable in the adjacent open end of said guide when said spring is uncompressed.

4. A releasable securing means comprising a compressible tubular guide composed of a helical coil spring and a tubular element of the same internal and external diameter as said spring, said spring and tubular element being in end-abutting relation, a first connector in the form of a doubled wire located in said guide and having hooks at its open end engaging the other end of said tubular element remote from the spring, the doubled end extending beyond the opposite end of the guide, a second connector in the form of a doubled wire located in said guide and having hooks at its open end adjustably engaged with convolutions of said spring, the doubled end of said second connector extending beyond the other end of said guide, and a trigger pivoted at one end to the doubled end of said second connector, the free end of said trigger being receivable in the adjacent open end of said tubular element when said spring is uncompressed.

5. A releasable securing means comprising a compressible tubular guide composed of a helical coil spring and a tubular element of the same internal and external diameter as said spring, said tubular element being formed of a transparent substantially rigid material, said spring and tubular element being in end-abutting relation, a first connector in the form of a doubled wire located in said guide and having hooks at its open end engaging the other end of said tubular element remote from the spring, the doubled end extending beyond the opposite end of the guide, a second connector in the form of a doubled wire located in said guide and having hooks at its open end adjustably engaged with convolutions of said spring, the doubled end of said second connector extending beyond the other end of said guide, and a trigger pivoted at one end to the doubled end of said second connector, the free end of said trigger being receivable in the adjacent open end of said tubular element when said spring is uncompressed.

6. A tension release device comprising a compressible tubular guide element having helical convolutions at and adjacent one end, a pair of oppositely disposed generally U-shaped wire connectors disposed in said guide element with the doubled ends thereof projecting beyond the ends of said guide element, the free ends of one of said connectors being disposed in the helical convolutions of said guide element to provide for axial adjustment of said one connector, the free ends of the other connector being engaged at the opposite end of said guide element, and a trigger pivoted to the doubled end of said first connector and receivable in the adjacent end of said guide element when said tubular guide element is uncompressed.

7. A release device comprising a compressible tubular guide consisting of a helical spring and a substantially rigid tubular element of substantially the same inside and outside diameter as said spring, said spring and tubular element being assembled together in end-abutting relation, a pair of generally U-shaped connector elements disposed within said guide and having their doubled ends projecting beyond opposite ends of said guide, a trigger pivoted at one end to the doubled end of one of said connector elements adjacent the end of said tubular element remote from said spring and having its free end receivable in said tubular element, the open ends of said connector elements being secured to said tubular guide adjacent its ends, and a hollow member sleeved over said spring and having an abutment plate engageable with the end of said spring remote from said tubular element, said trigger being releasable upon compression of said spring resulting from tension between said connector elements or from tension between said hollow member and the connector element whose doubled end projects beyond said spring.

8. A release device comprising a compressible tubular guide consisting of a helical spring and a substantially rigid tubular element of substantially the same inside and outside diameter as said spring, said spring and tubular element being assembled together in end-abutting relation, a pair of generally U-shaped connector elements disposed within said guide and having their doubled ends projecting beyond opposite ends of said guide, a trigger pivoted at one end to the doubled end of one of said connector elements adjacent the end of said tubular element remote from said spring and having its free end receivable in said tubular element, the open ends of said connector elements being secured to said tubular guide adjacent its ends, and a hollow member sleeved over said spring and having an abutment plate engageable with the end of said spring remote from said tubular element, said trigger being releasable upon compression of said spring resulting from tension between said connector elements or from tension between said hollow member and the connector element whose doubled end projects beyond said spring, and said hollow element being in the form of a generally tubular float having a bore of a size to receive said spring and tubular element.

9. A release device comprising a compressible tubular guide consisting of a helical spring and a substantially rigid tubular element of substantially the same inside and outside diameter as said spring, said spring and tubular element being assembled together in end-abutting relation, a pair of generally U-shaped connector elements disposed within said guide and having their doubled ends projecting beyond opposite ends of said guide, a trigger pivoted at one end to the doubled end of one of said connector elements adjacent the end of said tubular element remote from said spring and having its free end receivable in said tubular element, the open ends of said connector elements being secured to said tubular guide adjacent its ends, and a hollow member sleeved over said spring and having an abutment plate engageable with the end of said spring remote from said tubular element, said trigger being releasable upon compression of said spring resulting from tension between said connector elements or from tension between said hollow member and the connector element whose doubled end projects beyond said spring, said hollow member being in the form of a generally tubular float having a bore of a size to receive said spring and tubular element, and said abutment plate having an opening therein through which the doubled end of one of said connector elements extends.

10. A releasable securing means for a sinker or the like comprising a tubular guide comprising a helically coiled spring, a pair of elements extending through said tubular guide and connected thereto so that tension applied between said elements compresses said spring, at least one of said elements having an end protruding beyond the adjacent end of said tubular guide, and a trigger pivoted at one end to the protruding end of one of said elements and having its free end received in the adjacent end of said guide.

11. A compressible tubular guide comprising a helically wound spring, a first connector extending through and protruding beyond one end of said guide and secured to said guide adjacent the other end thereof, a second connector extending through and protruding beyond one end of said guide and engaging the opposite end thereof, and a trigger pivoted at one end to the protruding end of one of said connectors, the free end of said trigger being receivable in said guide when said guide is uncompressed.

12. A helically coiled spring, a tubular element abutting one end of said spring and constituting therewith a compressible tubular guide, a first connector extending through and protruding beyond one end of said guide and secured to said guide adjacent the other end thereof, a second connecter extending through and protruding beyond the other end of said guide and engaging the opposite end thereof, and a trigger pivoted at one end to the protruding end of one of said connectors, the free end of said trigger being receivable in said guide when said guide is uncompressed.

13. A helically coiled spring, a float element surrounding said spring, a tubular element abutting one end of said spring and constituting therewith a compressible tubular guide, a first connector extending through and protruding beyond one end of said guide and secured to said guide adjacent the other end thereof, a second connector extending through and protruding beyond the other end of said guide and engaging the opposite end thereof, and a trigger pivoted at one end to the protruding end of one of said connectors, the free end of said trigger being receivable in said guide when said guide is uncompressed.

14. A compressible tubular guide comprising a coiled helical spring, a transparent tube abutting one end of said spring, a float element surrounding said spring, a first doubled wire extending through said guide having a bight extending beyond one end of said guide and provided with hooks at its ends engaging one end of said guide, a second oppositely disposed doubled wire extending through said guide having a bight extending beyond one end of said guide and provided with hooks at its ends engaging the said guide adjacent the other end thereof, and a trigger pivoted at one end to the bight of the second doubled wire which extends beyond said tube and receivable therein to releasably engage a sinker or the like.

15. A release device comprising a compressible tubular guide consisting of a helical spring and a substantially rigid tubular element of substantially the same inside and outside diameter as said spring, said spring and tubular element being assembled together in end-abutting relation, a pair of generally U-shaped connector elements disposed within said guide and having their doubled ends projecting beyond opposite ends of said guide, the open ends of said connector elements being secured to said tubular guide adjacent its ends, a trigger pivoted at one end to the doubled end of one of said connector elements, the length of said trigger being such that when said spring is uncompressed, the free end of said trigger is retained within the adjacent end of said tubular guide, and a hollow member sleeved over said guide having an abutment plate engaged against the end of said tubular guide remote from said trigger, said plate having an opening therethrough through which the doubled end of one of said connector elements extends, and said trigger being releasable upon compression of said spring resulting from tension between said connector elements or from tension between said hollow member and the connector element whose doubled end projects beyond said plate.

16. A releasable securing means comprising a compressible tubular guide composed of a helical coil spring and a tubular element of the same internal and external diameter as said spring, said spring and element being in end-abutting aligned relation, a first connector in the form of a doubled wire located in said guide and having hooks at its open end engaging one end of said guide and the doubled end extending beyond the opposite end of the guide, a second connector in the form of a doubled wire located in said guide and having hooks at its open end secured to said guide adjacent the said opposite end thereof, and the doubled end of said second connector extending beyond the said one end of said guide, said first and second connectors constituting the sole means for retaining said helical coil spring and tubular element in end-abutting aligned relationship, and a trigger pivoted at one end to the doubled end of one of said connectors, the free end of said trigger being receivable in the adjacent open end of said guide when said spring is uncompressed.

17. A releasable securing means comprising an elongated tubular guide, said tubular guide being longitudinally resiliently compressible, a pair of elements extending through said tubular guide and connected thereto so that tension applied between said elements longitudinally compresses said tubular guide, at least one of said elements having an end protruding beyond the adjacent end of said tubular guide, and a trigger pivoted at one end to the protruding end of the said one of said elements and having its other end received in the adjacent end of said tubular guide.

NOEL GOODMAN.

REFERENCES CITED

The following references are of record in the file of this patent:

UNITED STATES PATENTS

| Number | Name | Date |
|---|---|---|
| 337,669 | Davis | Mar. 9, 1886 |
| 472,783 | Burk | Apr. 12, 1892 |
| 704,265 | McMaster | July 8, 1902 |
| 1,116,268 | Hansen | Nov. 3, 1914 |
| 1,270,605 | Downham | June 25, 1918 |
| 1,299,821 | Carpmill | Apr. 8, 1919 |
| 2,065,854 | Edel | Dec. 29, 1936 |
| 2,120,528 | Purweet | June 14, 1938 |